United States Patent [19]

Jevec et al.

[11] Patent Number: 5,632,900

[45] Date of Patent: May 27, 1997

[54] WET OXIDATION METHOD OF TREATING CHELATE BEARING WASTE SOLUTIONS

[75] Inventors: John M. Jevec, Uniontown; Carl J. Lenore, North Benton, both of Ohio

[73] Assignee: The Babcock & Wilcox Company, New Orleans, La.

[21] Appl. No.: 424,834

[22] Filed: Apr. 19, 1995

[51] Int. Cl.$^6$ .................................................. C02F 1/72
[52] U.S. Cl. ........................... 210/721; 210/724; 210/761; 210/912
[58] Field of Search .................................... 210/721, 722, 210/724, 758, 759, 761, 762, 912–914

[56] References Cited

U.S. PATENT DOCUMENTS

| | | | |
|---|---|---|---|
| 4,419,246 | 12/1983 | Jayawant | 210/721 |
| 4,512,900 | 4/1985 | Macur et al. | 210/912 |
| 4,629,570 | 12/1986 | Kennedy, Jr. | 210/912 |
| 5,160,631 | 11/1992 | Frost et al. | 210/724 |
| 5,178,772 | 1/1993 | Daley et al. | 210/721 |

OTHER PUBLICATIONS

Evans, D.W. et al., "Treatment and Disposal of Steam Generator and Heat Exchanger Chemical Cleaning Wastes", Ontario Hydro Research, pp. 1–12, admitted art.

Beller, John, "Supercritical Water Oxidation Program", admitted art.

"Pilot Plant Evaluation of the Mobile Wet Oxidation Process", Finger, S. et al.

Duratek Corp., Atwood, Allen, Bechtel Corp. admitted art.

*Primary Examiner*—Thomas G. Wyse
*Attorney, Agent, or Firm*—Daniel S. Kalka; Robert J. Edwards

[57] ABSTRACT

A method for treating a chelate bearing waste solution employs a two-step process which includes elevating the pH of the solution to a pH greater than 10 and precipitating the metal as the hydroxide out of solution, followed by treating the resultant solution with an oxidant to destroy any remaining free chelate.

3 Claims, No Drawings

WET OXIDATION METHOD OF TREATING CHELATE BEARING WASTE SOLUTIONS

BACKGROUND OF THE INVENTION

1. Field of the Invention

The present invention relates generally to a process for chemical waste disposal, and more particularly to a wet oxidation process for disposal of a chelate waste solution.

2. Description of the Related Art

Chelates are used in both fossil and nuclear steam generator chemical cleaning processes. Waste disposal from a fossil unit cleaning is normally sent off site for treatment and disposal. Nuclear cleaning wastes are generally slightly contaminated with radionuclides and as such require disposal at an approved nuclear waste disposal site.

Due to the high disposal costs at approved nuclear waste disposal sites, cleaning wastes are currently evaporated to less than 85% of the original volume. The resultant concentrate is then solidified and sent for burial. While this is sufficient for the present, it is anticipated in the near future that the disposal of chelates at approved nuclear waste sites will be discontinued. The chelates will have to be removed from the chemical cleaning waste prior to disposal.

U.S. Pat. No. 5,225,087 describes a recovery process of EDTA from steam generator cleaning solutions. U.S. Pat. No. 4,780,238 relates to natural chelating agents for radio nuclide decorporation. U.S. Pat. No. 4,681,705 describes a method of decontaminating mixtures of radioactively contaminated liquids. U.S. Pat. No. 4,587,043 also describes the decontamination of metal surfaces in nuclear power reactors. U.S. Pat. No. 4,880,595 relates to a process and apparatus for cleaning nuclear reactor cooling water. Other patents related to this subject matter include U.S. Pat. Nos. 5,115,036; 4,578,162; and 4,629,570.

Traditional wet oxidation processes are very effective in the destruction of free chelates. A free chelate is defined as those chelates that have not formed a complex with a metal ion. In a chemical cleaning solution, the majority of the chelates are in the complex state. This makes the chelate difficult to destroy using the traditional wet oxidation methods.

Accordingly, there is a need for a process which allows the safe disposal of chelate. Preferably, the method would separate the chelate from the metal complex to a free state where it could then be treated with a wet oxidation method to achieve a destruction of the chelate to 99.9% or greater.

SUMMARY OF THE INVENTION

The present invention is directed to the above-mentioned problems with the prior art as well as others by providing a two-step process which results in the destruction of chelates in chemical cleaning solutions. The first step in the process of the present invention is to separate the chelate from the metal complex. After achieving this, the metal ions are precipitated and filtered from the solution. The resultant solution contains only free chelates which are then treated with wet oxidation methods to achieve a 99.9% or greater destruction. In the initial step, the pH of the solution is elevated with the addition of a base to a pH of 10 or greater. This is sufficient to separate the metal from the chelate complex and precipitate the metal as a hydroxide. After precipitation, the solution is filtered to remove the metals. The resultant solution is then treated with an oxidant to destroy any remaining free chelates.

One aspect of the present invention is to provide a process for treatment and disposal of waste solutions containing chelates.

A second aspect of the present invention is a two-step process for treating chelate bearing waste solutions.

The various features of novelty which characterize the invention are pointed out with particularity in the claims annexed to and forming a part of this disclosure. For a better understanding of the invention, its operating advantages and specific objects attained by its uses, reference is made to the descriptive matter in which the preferred embodiment of the invention are illustrated with examples.

DESCRIPTION OF THE PREFERRED EMBODIMENTS

The present invention resides in a two-step process for treating chemical cleaning solutions containing chelates. The first step in the process is to elevate the pH of the solution with the addition of a base, such as sodium hydroxide (NaOH), to a pH of about 10, preferably 10.5 or greater, which is usually sufficient to separate the metal ion from the chelate complex and precipitate the metal as a hydroxide. Some metals are particularly difficult to precipitate, for example copper. In those cases, it is necessary to use additional additives to force the precipitation of the metal ions. Suitable additives would include the following additives; calcium hydroxide, calcium oxide and dialkyldithiocarbamate. The concentrations of additives is determined by the concentration of metal ions to be removed.

After precipitation, the solution is filtered to remove the metals. The remaining solution is treated with an oxidant like hydrogen peroxide ($H_2O_2$) to destroy any remaining free chelates. It is envisionable that any traditional wet oxidation method can be used at this stage to oxidize the chelate to make them suitable for disposal. This second step of the process proceeds more efficiently if the pH of the solution is dropped back to or near neutral (about pH=7.0). This does not add any unnecessary steps to the process since the resultant pH of the solution needs to be adjusted to near neutral prior to discharge or disposal. Advantageously, the method of the present invention is a low temperature application that is applied at ambient temperature. The chelate destruction reactions are exothermic so that temperatures approaching the boiling point, i.e., 100° C. (212° F.) often occur particularly when there are large quantities of chelate present. After this destruction, the resultant solution is free of chelates and metal ions.

The chelate destruction process of the present invention results in a solution that is acceptable for discharge to a local sewer system after proper verification of results. This greatly reduces the burial costs associated with disposal of steam generator chemical cleaning wastes since a premium is paid for wastes containing chelates. In addition, the burial of chelate bearing nuclear cleaning wastes is anticipated to be severely restricted in the future.

EXAMPLES

A three test matrix was evaluated in this study. Each test was run with 500 ml of solvent (initial total EDTA of 150 g/l). The first test solution was pH adjusted to 10.5 with sodium hydroxide. The solution was filtered through a Whatman #41 filter paper then through a 0.45 micron Millipore membrane. The filtration process took over 1 hour to complete due to the fine consistency of the ferric hydroxide sludge. The filtrate was placed in a one liter beaker, stirred continuously, and 100 ml of 50% hydrogen peroxide added over a period of 15 minutes. The peroxide addition resulted in severe outgassing of the solution and the exothermic reaction raised the solution temperature to about 205°–210° F. almost immediately. The peroxide was added with a burette near the bottom of the beaker. After 24 hours the solution was analyzed for total EDTA content.

The pH of the second 500 ml solution was increased to about 11.5. Precipitated ferric hydroxide was filtered in the same manner described above. Again, it took a considerable length of time to filter the ironladen solution. 100 ml of 50% hydrogen peroxide was added to the filtered solution. This time there was not obvious outgassing as the peroxide was added nor was there evidence of an exothermic reaction. However, after standing idle for a period of 2.5 hours a violent reaction took place. Rapid outgassing and an extreme exothermic reaction caused the solution to explode out of the beaker. This reaction took place instantaneously and only approximately 50ml remained in the beaker (for analysis) after the reaction occurred.

The pH of the third solution was increased to 11.5 the iron filtered off and then the solution was readjusted back to 7.0. Hydrogen peroxide was then added to the solution at the neutral pH. Peroxide addition resulted in solution outgassing and a rapid exothermic reaction. This solution was allowed to stand for 24 hours and then checked for total EDTA.

The total EDTA values for the three test solutions 10 are presented below:

| TEST 1 (pH 10.5) | 18.8 g/l Total EDTA |
| TEST 2 (pH 11.5) | 17.6 g/l Total EDTA |
| TEST 3 (pH 7.0)  | 0.19 g/l Total EDTA |

These test results basically show that once the EDTA-iron bond is broken, the EDTA is readily decomposed by the presence of hydrogen peroxide. In fact, only 66% of the stoichiometric amount of 50% peroxide was added to achieve the greater than 99% reduction in EDTA in Test 3.

The high pH-wet oxidation method basically removes all iron and EDTA from solution. However, cobalt and cesium would still be present in an actual spent nuclear cleaning solvent.

Although specific embodiments of the invention have been shown and described in detail to illustrate the application of the principles of the invention, it is understood that the invention may be embodied otherwise without departing from such principles.

We claim:

1. A method for treating a chelate metal bearing waste solution from a chemical cleaning solution for a steam generator, comprising the steps of:

elevating the pH of the chelate bearing waste solution from a chemical cleaning solution for a steam generator to a pH of greater than about 10.0 for separating a metal from the chelate bearing waste solution as a precipitate;

filtering the chelate bearing waste solution after precipitation to remove the metal precipitate; and oxidizing the chelate bearing waste solution to destroy any remaining free chelates.

2. A method as recited in claim 1, wherein the oxidizing step further comprises the step of treating the chelate bearing waste solution with an oxidant.

3. A method as recited in claim 1, further comprising the step of adjusting a pH of the chelate bearing waste solution after the filtering step to a pH near neutral; and then oxidizing the resultant solution to destroy any remaining free chelates.

* * * * *